United States Patent [19]

Park

[11] Patent Number: 5,573,194
[45] Date of Patent: Nov. 12, 1996

[54] TAPE TENSION CONTROLLING APPARATUS FOR A REEL SHIFT DECK MECHANISM

[75] Inventor: Gun S. Park, Seoul, Rep. of Korea

[73] Assignee: LG Electronics Inc., Seoul, Rep. of Korea

[21] Appl. No.: 487,653

[22] Filed: Jun. 7, 1995

[30] Foreign Application Priority Data

Jun. 13, 1994 [KR] Rep. of Korea .................. 13239/1994

[51] Int. Cl.$^6$ .......................... G11B 15/32; G11B 15/43
[52] U.S. Cl. .................. 242/334.6; 242/336; 242/422.8
[58] Field of Search .................. 242/334, 334.6, 242/336, 416, 421, 421.5, 421.8, 422, 422.4, 422.7, 422.8; 360/94

[56] References Cited

U.S. PATENT DOCUMENTS 3,912,191  10/1975  Anderson et al. .................. 242/422.8
5,105,319   4/1992  Ohoka et al. .................. 360/94

FOREIGN PATENT DOCUMENTS 715410   8/1965  Canada .................. 242/334
63-112845  5/1988  Japan .................. 360/94

Primary Examiner—John P. Darling

[57] ABSTRACT

A tape tension controlling apparatus for a reel shift deck mechanism includes a motor, a first transfer gear coupled with a motor shaft, worm gear engaged with the first transfer gear, a second transfer gear engaged with the worm gear, a link lever rotatably connected to a shaft of the second transfer gear, a stopper for positioning a predetermined position of the reel, a reel to be displaced at a predetermined position, a tension arm inserted into a rotation shaft located at a predetermined line crossing at a right angle on segment between center portions before and behind position displacements of the reel, a tension bend provided between a fixed portion and a movable portion in order to maintain a regular tension. The link lever is driven to rotate by the motor and transmits a rotation force of the motor to the reel. The tape tension controlling apparatus is improved in that a tension of the tape is maintained with a predetermined state.

4 Claims, 3 Drawing Sheets

TAPE TENSION CONTROLLING APPARATUS FOR A REEL SHIFT DECK MECHANISM

BACKGROUND OF THE INVENTION

1. Field of the Invention

This invention relates to a tape tension controlling apparatus for a reel shift deck mechanism and more particularly, to a tape tension apparatus, used for a magnetic recording and reproducing apparatus such as a video tape recorder (referred to hereinafter as a VTR), for controlling the tape tension at different positions according to various sizes of tape cassettes.

1. Description of the Conventional Art

A tape tension controlling apparatus used in a recent VTR is generally designed such that when a tape cassette is inserted in the cassette holder in a substantially horizontal state, the tape tension apparatus is operated at a predetermined position. In this case, the tape tension apparatus does not maintain a regular tension because a mounting position of a reel is fixed with respect to a base plate.

FIG. 1 illustrates a conventional tape tension controlling apparatus. In this mechanism, after a cassette is inserted, the tape T drawn from a reel 1 is guided through a pair of guide members 2 and 3.

A tension arm 4 is located at a predetermined position on a base plate (not shown). Also, the tension arm 4 pivots on a rotation shaft 5 provided at one end thereof and has a tension post 6 provided at the other end thereof. Thus, the tape T is driven around the tension post 6 between the guide members 2 and 3.

A tension band 7 is wound around a predetermined portion of a circumference of the reel 1. One end 8 of the tension band 7 is connected to the tension arm 4 and the other end 9 of the tension bend 7 is fixed on the base plate. Also, a tension spring 10 is connected at its one end to the tension arm 4 at a location opposed to the one end 8 of the tension band 7.

In order to maintain the tape tension, the tension arm 4 must be positioned at an equilibrium point of a tension band force Fb, a spring force Fs and a tension force F of the tape T. As a result, the tape tension controlling apparatus can only be controlled under certain conditions without applying an external force, and thereby the tape tension controlling apparatus cannot be widely utilized.

In this case, when the conventional tension controlling apparatus must be used with a one-fourth inch tape cassette, in case of changing the size of the tape cassette, the conventional tension controlling apparatus is not able to maintain a regular tension of the tape between the reel and the tension arm.

SUMMARY OF THE INVENTION

It is therefore an object of the present invention to provide a tape tension controlling apparatus suitable for using various sizes of tape cassettes without requiring a tension controlling system thereof.

According to the present invention, there is provided a tape tension controlling apparatus for a reel shift deck mechanism comprising a link lever rotatably connected to a shaft, a driving means for driving the link lever, reel means carried on the link lever so as to be displaceable between predetermined first and second positions according to a corresponding size of a tape, a tension arm rotatable about a point located on a line perpendicularly bisecting a segment line described between rotation centers of the reel means when displaced in said first and second predetermined positions, and a tension band provided between the reel means and the tension arm in order to maintain a regular tension force.

The tape tension controlling apparatus further comprises a pair of movable pieces mounted at both ends of the tension arm for guiding and maintaining a regular tension.

Additional objects and advantages of the invention will be apparent from the detailed description which follows, taken together with the accompanying drawings.

DESCRIPTION OF THE PREFERRED EMBODIMENTS

Figure 1:
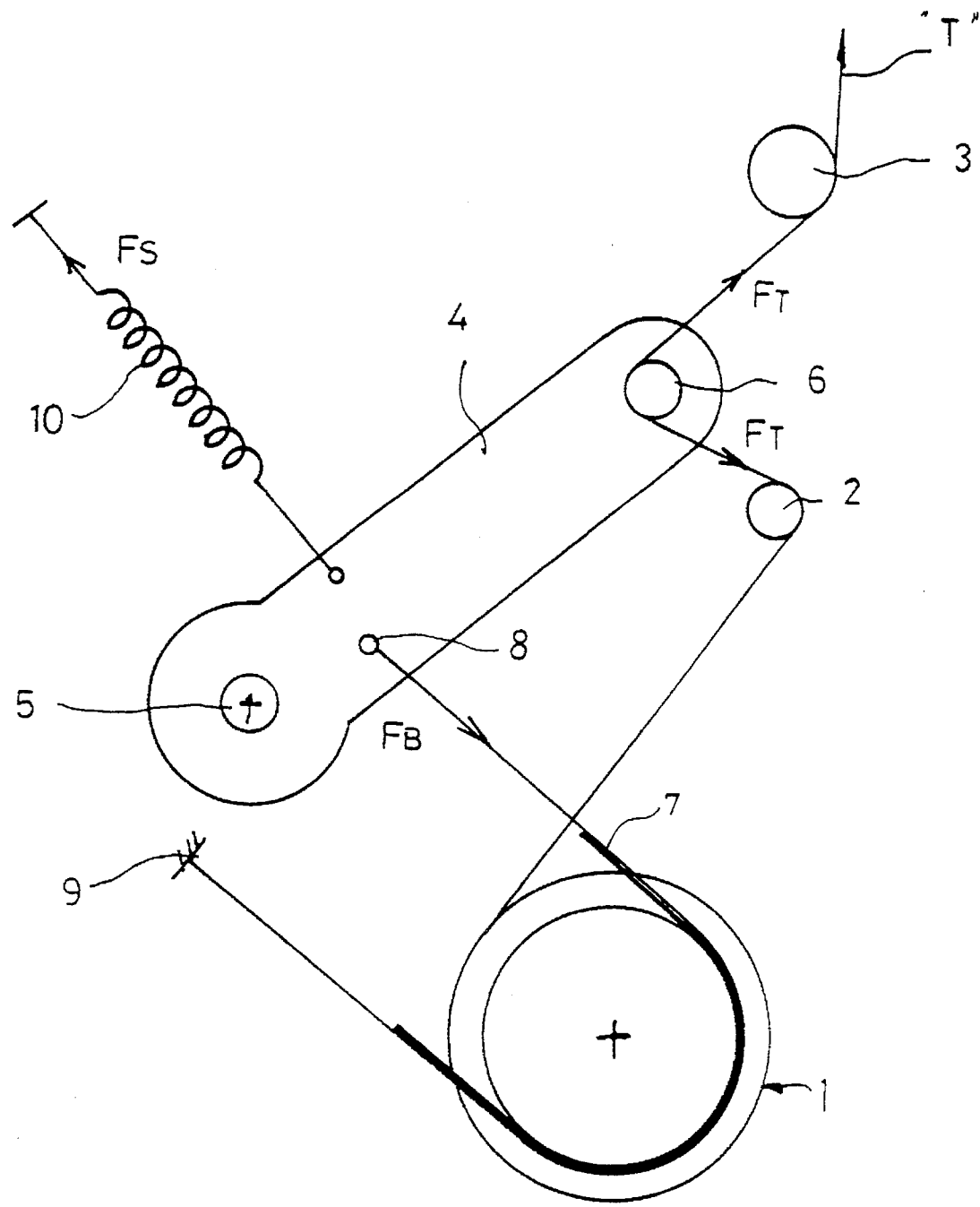
FIG. 1 is a plan view of a conventional tape tension controlling apparatus.
Figure 2:
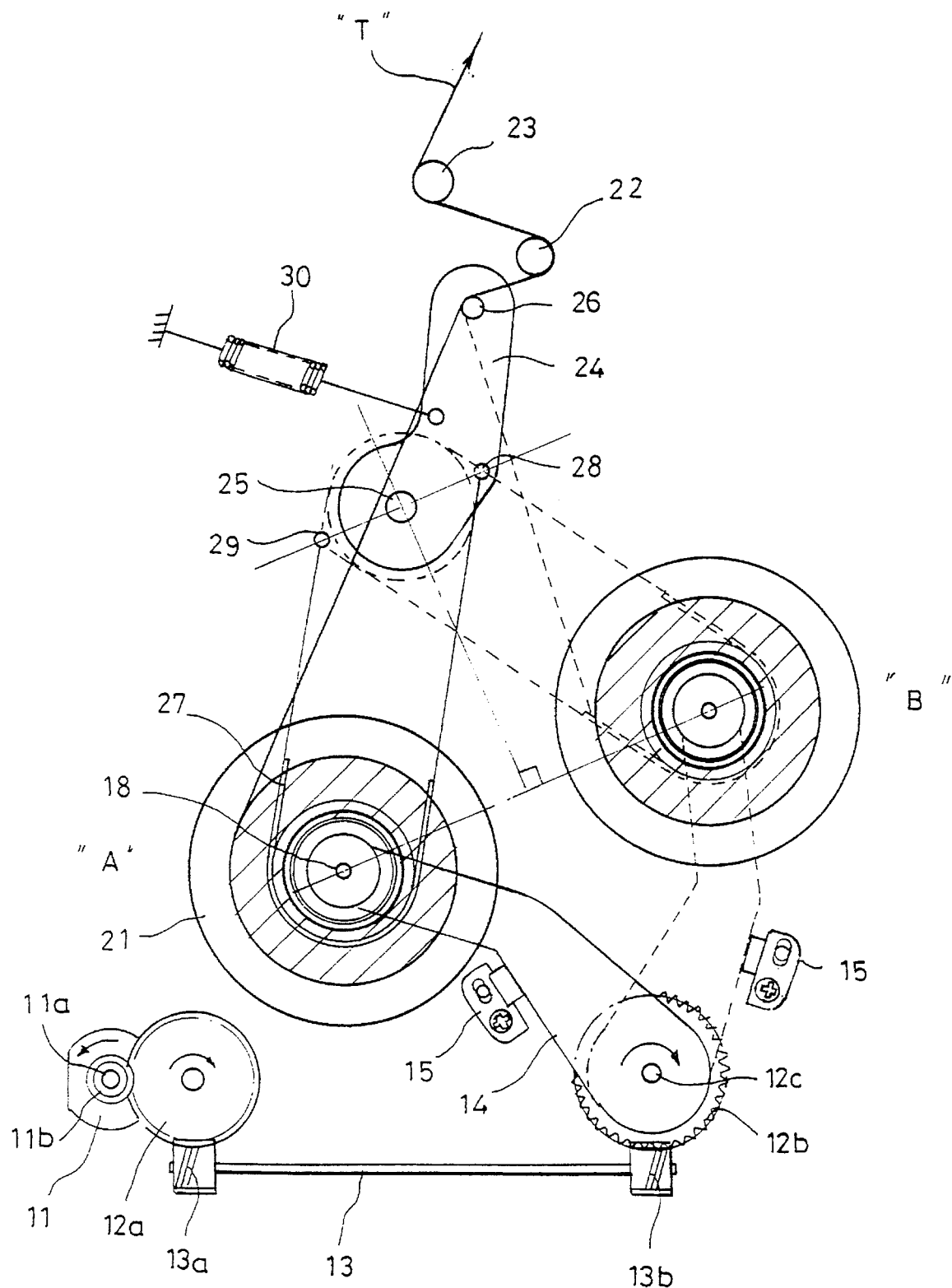
FIG. 2 is a plan view of a first embodiment of a tape tension controlling apparatus according to the present invention.

A first embodiment of the present invention will be explained below with reference to a tape tension controlling apparatus for a home VTR as shown in FIG. 2.

As shown in FIG. 2, a motor 11 is fixed to a predetermined position of a base plate (not shown). The motor has a motor shaft 11a on which is provided a drive gear 11b.

A first transfer gear 12a is meshingly engaged with the drive gear 11b of the motor shaft 11a of the motor 11 and with a first worm gear 13a, respectively. A second transfer gear 12b is engaged with a second worm gear 13b, with a pair of worm gears 13a and 13b being coaxially mounted at the respective ends of a worm shaft 13.

An angled link lever 14 carries at one end on a rotation shaft 18 disposed in a guide groove (not shown) of the base plate and is mounted at its other end on a shaft 12c of the second transfer gear 12b. Also, the link lever 14 is movable from a position A and a position B of a reel 21 by the rotation of the second transfer gear 12b.

Stoppers 15 are secured to the base plate at locations respectively corresponding to the side edges of a middle portion of the link lever 14 when same is at its position A and its position B. The stopper 15 is adjusted and controlled to a predetermined position to control the positioning of a reel 21 according to a cassette size.

Also, the reel 21 is displaced to a predetermined position according to a corresponding size of a tape cassette. The reel 21 is connected with the link lever 14 carrying the rotation shaft 18.

The reel 21 is located at a predetermined position on the base plate (not shown) so as to be movable between a position A and a position B. When the reel 21 is moved from position A to position B as shown in FIG. 2, the tension of a tension band 27 is maintained with a predetermined force, so that the tape tension of the tape T is maintained in spite of changing the position of the reel 21 to accommodate the tape cassette size.

In this mechanism, after a cassette is inserted, the tape T drawn from the reel 21 is guided through a pair of guide members 22 and 23 in a manner similar to that of the conventional an.

A tension arm 24 is mounted at a predetermined position on the base plate (not shown). Also, the tension arm 24 is inserted at one end thereof into a rotation shaft 25 and a tension post 26 is disposed at other end thereof. Thus, the tape T is drawn around the tension post 26 and the guide members 22 and 23.

The tension band 27 is wound around a predetermined portion of the circumference of the reel 21 so as to produce a friction force by the rotation of the reel 21.

One end of the tension band 27 is connected to a mount 28 disposed at one side of the tension arm 24 and the other end of the tension band 27 is connected to a mount 29 fixed on the base plate. Also, a tension spring 30 is connected at one end thereof to the tension arm 24.

In this embodiment, the position of the rotation shaft 25 is located at a point lying on a line perpendicular to and bisecting a segment drawn between displaced positions A and B of the reel 21. The tension band mounts 28 and 29 are positioned on a line intersecting tangent lines of the reel 21 and a concentric circle of the rotation shaft 25 of the tension arm 24.

When the reel 21 is moved from position A to position B, the tension arm 24 is not moved, so that a tape tension between the reel 21 and the tension arm 24 is maintained with a regular state.

In operation, the tape T, contained in a cassette (not shown) in a wound state on the reel 21, is drawn out by the drawing members (not shown) in a conventional manner.

The operation of the tape tension controlling apparatus of the invention will be explained with the reference to FIG. 2.

Due to the rotation of the motor 11, the drive gear 11b is rotated and the rotation of the drive gear 11b rotates the first transfer gear 12a and then the first worm gear 13a.

Due to the corresponding rotation of the second worm gear 13b, the second transfer gear 12b is rotated and the rotation of the second transfer gear 12b causes the link lever 14 to be rotated. Accordingly, in a case where, for example, the link lever 14 is rotated in a clockwise direction as shown in FIG. 2, the reel 21 is moved from the position A to the position B.

When the reel 21 is moved from the position A to the position B, the tension band 27 is maintained with a predetermined length, so that the tension arm 24 is maintained at its initial position.

According to the embodiment of the present invention, it is thereby possible to obtain a tape tension controlling apparatus for maintaining the tape tension regardless of changing the size of the tape cassette.

During the changing operation of the tape cassette, the above-described operation is performed in the opposite order.

Now, a second embodiment according to the present invention will be described with the reference to FIG. 3.

Figure 3:
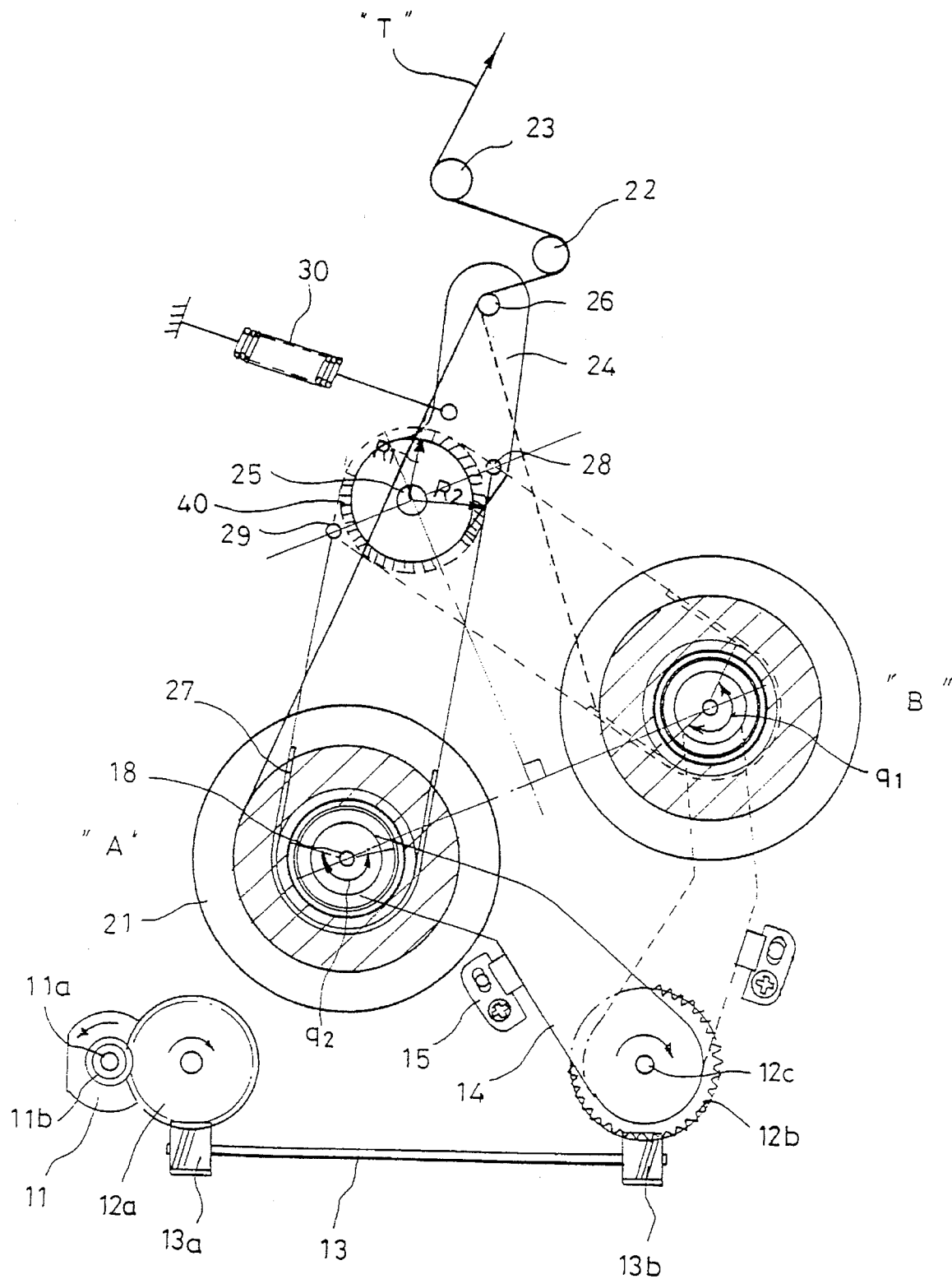
FIG. 3 is a plan view of a second embodiment of the tape tension controlling apparatus according to the present invention.

As shown in FIG. 3, a movable member 40 is provided in the vicinity of the rotation shaft 25 of the tension arm 24. One end of movable member 40 is connected to the base plate and the other end of the movable member 40 is connected to a predetermined portion of the tension arm 24.

In this embodiment, winding angles q1 and q2 of the tension band around the reel 21 at the respective A and B positions are maintained the same and the radii R1 and R2 between the rotation center of the tension arm 24 and the mounting point of the tension band 27 are equally maintained at positions A and B of the reel 21, respectively. That is, in the position A or B, the tape tension is maintained in a balanced state. Accordingly, the user can be control the position of the mounts of the tension band 27 by providing the movable member 40.

Since the reel position of the present invention is shifted according to the cassette size, there is no need of changing a tension controlling system.

Therefore, an alteration of the tension of the tape cassette in the deck mechanism can be prevented, and a regular tape tension can be maintained for a long period of time. Also, a total size of the VTR can be rendered compact and thin due to the tape position transformation.

Although the invention has been described in its preferred form with a certain degree of particularity, it is understood that the present disclosure of the preferred form has been charged in the details of construction and the combination and arrangement of parts may be resorted to without departing from the spirit and the scope of the invention as hereinafter claimed.

What is claimed is:

1. A tape tension controlling apparatus for a reel shift deck mechanism comprising:

a link lever rotatably connected to a shaft;

driving means for driving the link lever;

reel means carried on said link lever so as to be displaceable between predetermined first and second positions according to a corresponding size of a cassette;

a tension arm rotatable about a point located on a line perpendicularly bisecting a segment line described between rotation centers of the reel means when displaced in said first and second predetermined positions; and a tension band provided between said reel means and said tension arm in order to maintain a tape tension force when said reel means is located in each of said first and second positions.

2. The tape tension controlling apparatus according to claim 1, wherein said driving means includes a motor, a first transfer gear coupled with a motor shaft so as to transfer a driving force of the motor, a first worm gear engaged with the first transfer gear, a second worm gear connected with the first worm gear, and a second transfer gear engaged with the second worm gear.

3. The tape tension controlling apparatus according to claim 1, wherein said tension arm includes a moveable means and connection portions connected to both sides of the tension band.

4. The tape tension controlling apparatus according to claim 1, wherein said apparatus further includes a movable member connected around both ends of the tension arm so as to provide a tape tension at said first and second positions of the reel.

* * * * *